J. O. SHAFER.
PUMP TRANSMISSION MECHANISM.
APPLICATION FILED MAY 29, 1914.
1,135,060.
Patented Apr. 13, 1915.
2 SHEETS—SHEET 1.
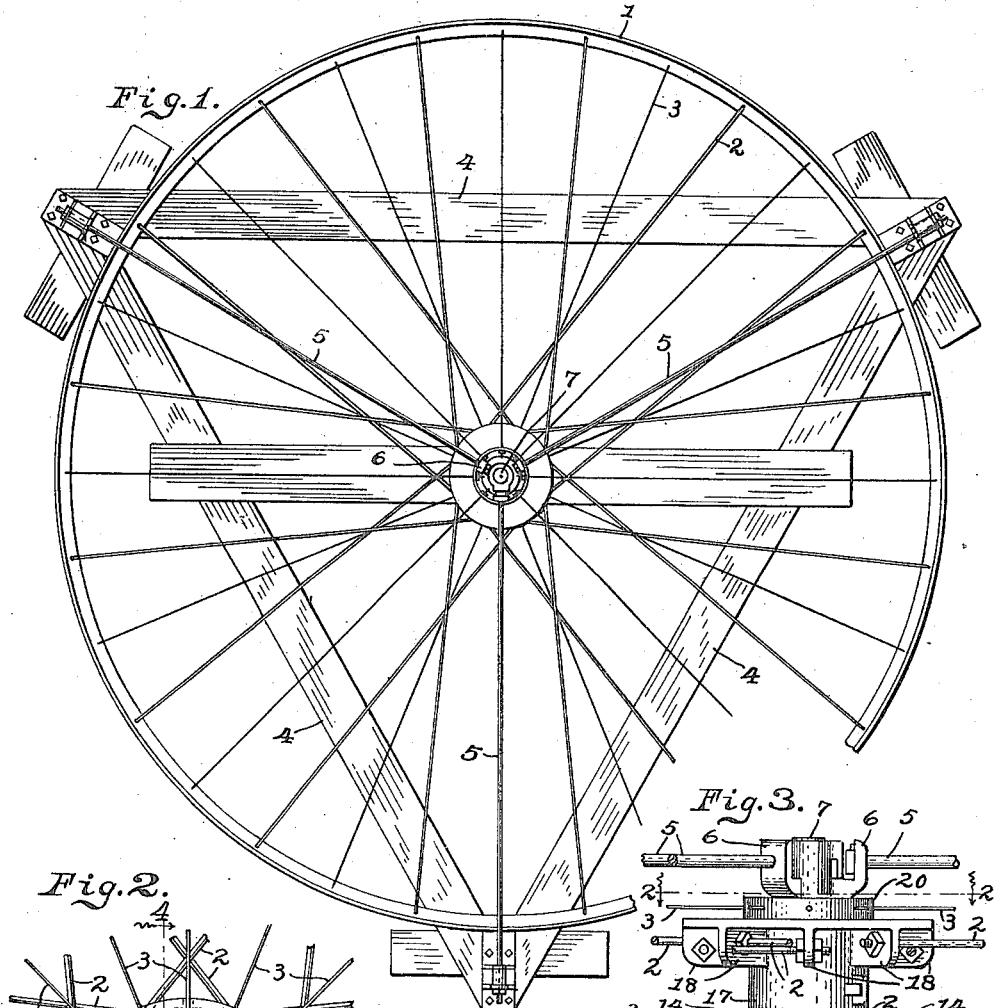
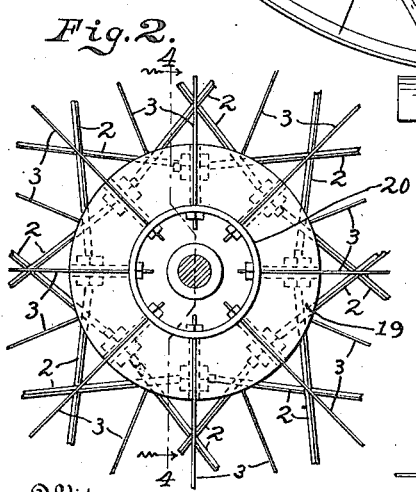
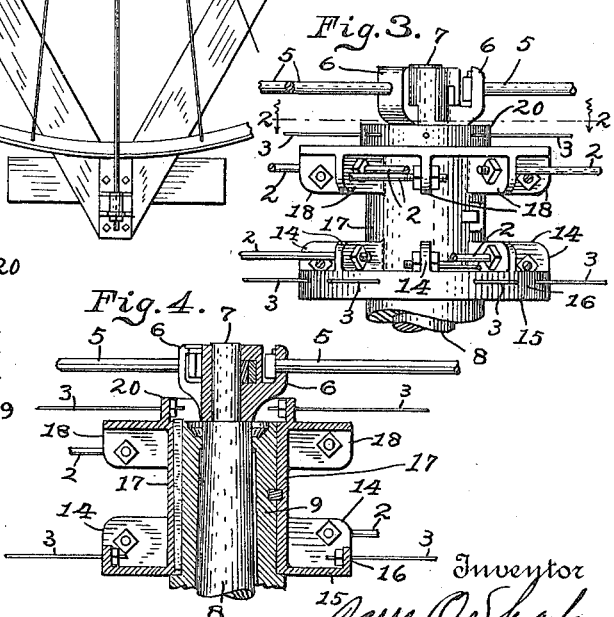

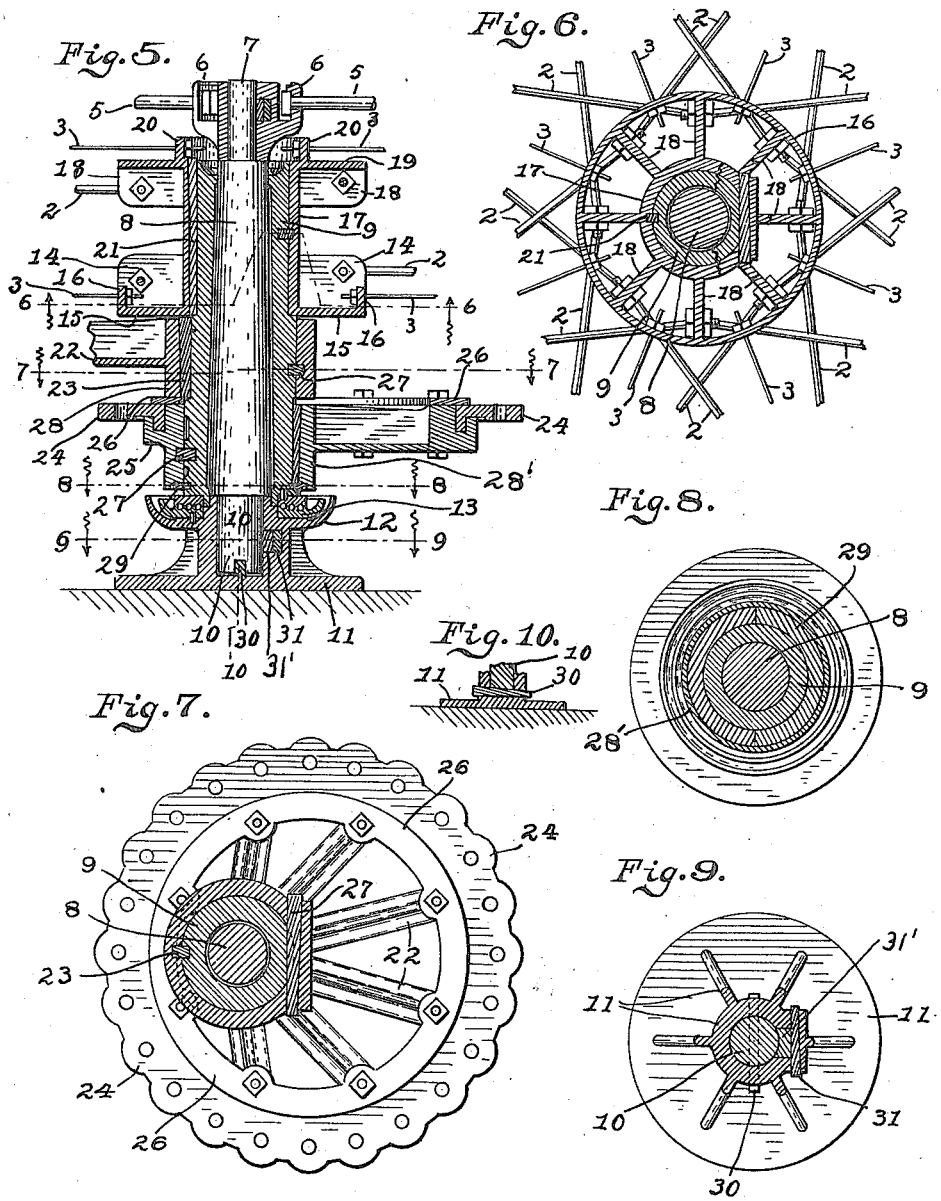

UNITED STATES PATENT OFFICE.

JESSE O. SHAFER, OF BLUFFTON, INDIANA, ASSIGNOR TO THE GEO. W. GRIMES COMPANY, OF BLUFFTON, INDIANA, A CORPORATION OF INDIANA.

PUMP TRANSMISSION MECHANISM.

1,135,060.　　　　　Specification of Letters Patent.　　Patented Apr. 13, 1915.

Application filed May 29, 1914. Sreial No. 841,828.

*To all whom it may concern:*

Be it known that I, JESSE O. SHAFER, a citizen of the United States, residing at Bluffton, Wells county, and State of Indiana, have invented and discovered certain new and useful Improvements in Pump Transmission Mechanisms, of which the following is a specification.

My invention relates to power transmission mechanisms for oil well pumps. Its objects are to provide a band wheel which shall be capable of effectively resisting the usual strains imparted thereto and yet which shall be simple in construction; to provide means for making the wheel readily removable from its support and means for obtaining a centering of the rim of the band wheel without springing the rim or distorting the spokes.

With these objects in view my invention is embodied in preferable form in the construction hereinafter described and illustrated in the accompanying drawings.

In these drawings, Figure 1 is a plan view of the wheel; Fig. 2 an enlarged detail section on line 2—2 of Fig. 3 of the hub and central portion of the wheel; Fig. 3, a detail elevation of hub; Fig. 4 a vertical section on line 4—4 of Fig. 2 of upper part of support, standard and hub; Fig. 5, a vertical section of wheel supporting means; Fig. 6, a horizontal section on the line 6—6 of Fig. 5, looking up; Fig. 7, a section on line 7—7 of Fig. 5, looking down; Fig. 8, a section on line 8—8 of Fig. 5; Fig. 9 a section on the line 9—9 of Fig. 5 and Fig. 10, a detail section on line 10—10 of Fig. 5.

Referring to the drawings, 1 is the rim of the band wheel which the belt or band from the engine engages and 2 are the driver spokes and 3, tension spokes. A supporting frame 4 of usual structure is provided and from the corners of this frame extend guy rods 5 which are connected to a sleeve 6 which is fixed on the reduced upper end stem 7 of a fixed supporting post 8 around which is adapted to rotate the wheel supporting sleeve 9. The post 8 is provided at its lower end with a reduced stem 10 which fits within a socket formed in a fixed base member 11. This base member has an upper cup-shaped portion 12 in which are mounted suitable ball bearings 13, the upper half of which bearings is adapted to receive the lower face of the rotatable sleeve 9. To more effectively distribute the torsional and tension strains between the driving rim and the hub of the wheel, the driver spokes 2 and the tension spokes 3 are divided into upper and lower decks or series, by connecting the alternate spokes with the hub of the wheel at points disposed in two different horizontal planes. The ends of the spokes that join the rim, however, are connected thereto in the same plane. The driver spokes 2 that are inclined downwardly from the rim are adapted to pass through and be connected to lugs 14 which extend upwardly at intervals from an annular horizontal flange 15 which is provided at its outer edge with an annular vertical flange 16 through which the downwardly projecting tension spokes 3 are adapted to pass and to which they are fastened. The lugs 14 and flange 15 are preferably cast integral with the sleeve of the hub 17 which is suitably keyed to the rotating sleeve 9. This hub is elongated vertically and near its upper end is provided with radial and vertical lugs 18, through which pass and to which are fastened the upper driver spokes. These lugs 18 project downwardly from an annular flange 19 from which extends upwardly an annular vertical flange 20 through which pass the upper tension spokes 3. The apertures for the driver spokes in the lugs 14 and 18 are staggered vertically as shown in Fig. 3 for the purpose of permitting the driver spokes to pass near one another. It will be seen that a spoke joining the upper part of the hub and a spoke joining the lower part are arranged to meet at an angle approaching a straight angle. These respective pairs of spokes thus serving to oppositely brace the rim of the wheel.

21 indicates a vertical key adapted to connect the sleeve 9 and the hub 17.

The inner ends of all the spokes are threaded and are engaged by nuts on the inner sides of the lugs and such lugs are horizontally spaced from the body of the hub. Owing to this arrangement, the rim may be adjusted to center the same by tightening the nuts on the ends of the driver spokes, which permits such action to be effected without springing the rim or distorting the driver spokes.

The sleeve 9 is adapted to drive a pair of eccentric wheels from which power is to be transmitted to a plurality of well drilling rigs. As shown in the drawings, particularly in Figs. 5 and 7, the upper eccentric is indicated by 22 and it is keyed to the sleeve 9 by a vertical key 23. The lower eccentric is shown more in detail and it comprises the rim portion 24 and hub 25 and a retaining ring 26. A horizontal key 27 connects the hub of the wheel 22 with sleeve 9. The hub of the eccentric wheel 22 has a downward prolongation 28 which rests upon the ring 26 and similarly the hub 25 is provided with a downward prolongation 28'. This prolongation 28' of the hub 25 is adapted to rest upon the two halves of a split ring 29 which is seated partly in a recess formed in the lower portion of said prolongation and partly in a recess formed in the sleeve 9. By means of this arrangement after the horizontal keys connecting the eccentrics with the sleeve 9 have been removed or loosened, the eccentrics may be raised slightly and the two halves of the ring 29 withdrawn, thus permitting the withdrawal downward of the eccentrics with respect to the post 10 when said post has been released from its standard, which operation enables the eccentrics to be removed for repair or replacement without removing the band wheel, such as has customarily been required owing to the fact that heretofore provision has been made only for removing said eccentrics upwardly, thus requiring first the removal of the band wheel. In the lower part of the fixed post 10 is mounted a horizontally projecting wedge-shape key 30 which connects said post with the base 11 and the function of which is to permit of a slight upward adjustment of the post by driving the wedge in a greater or less distance. With a post thus adjustably mounted and having connection to the base solely through said key, the desired rigidity of connection between base and post cannot be obtained. Hence, I provide in association with said horizontally sloping wedge-shape key 30 a wedge-key 31 which passes through the wall of the base member and is adapted to bear against a clamping block 31' which bears rigidly against the reduced portion of the post and serves to hold said post rigidly connected to the base member in any position to which the post may be adjusted by means of the wedge key 30.

Having thus described my invention, what I claim is:

1. A band wheel for transmission mechanisms having a rim, a vertically elongated rotating hub, a series of radial tension spokes between said rim and hub, a series of non-radial larger driver spokes between said rim and hub, said hub having integral therewith annular radial horizontal upper and lower flanges, said flanges being provided with vertically extending flanges to which separate groups of said tension spokes are respectively connected, said upper radial flange having a series of separated downwardly projected vertical lugs, said lugs provided with apertures adapted to receive a number of said driver spokes, said lower radial flange being provided with upwardly projected separated vertical lugs, said latter lugs being provided with apertures to receive the remaining driver spokes, substantially as described.

2. In combination with a band wheel for transmission mechanisms, a rotating supporting member upon which said band wheel is mounted, a power transmitting member mounted on said rotating member, a fixed post on which said rotating member is mounted, a horizontal key accessible for removal to detachably connect said band wheel and transmitting members to said rotating member and separable means supporting one of said transmitting members on said rotating member and permitting the separation of the former from the latter in a downward direction, substantially as described.

3. In combination with a band wheel, a rotating member to which said band wheel is fixed, a fixed post supporting said rotating member, a transmitting member detachably secured to said rotating member, a supporting ring surrounding said rotating member and on which said transmitting member is adapted to rest, said ring being divided into a plurality of parts whereby the support may be withdrawn to permit the downward separation of the transmitting member from the post, substantially as described.

In witness whereof, I have hereunto set my hand and seal at Bluffton, Wells county, Indiana this 26th day of May, A. D. nineteen hundred and fourteen.

JESSE O. SHAFER. [L. S.]

Witnesses:
 ROBT. BARR,
 HOWARD L. NORRIS.

Copies of this patent may be obtained for five cents each, by addressing the "Commissioner of Patents, Washington, D. C."